Dec. 20, 1955 — R. W. HANKIN ET AL — 2,727,272
CURTAIN SLIDE, TRACK AND BRACKET
Filed Feb. 12, 1952 — 2 Sheets-Sheet 1
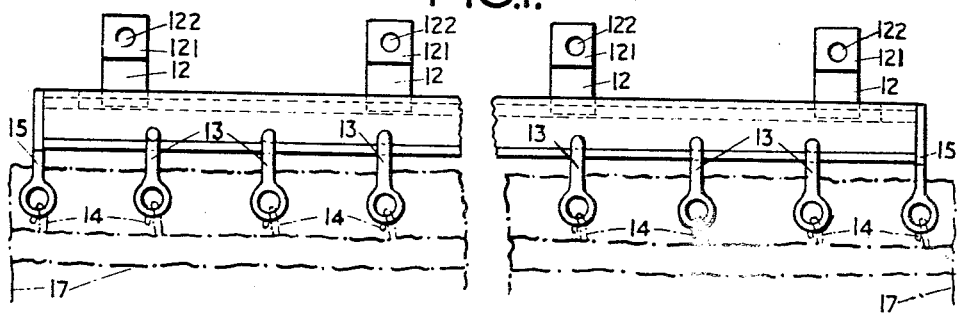
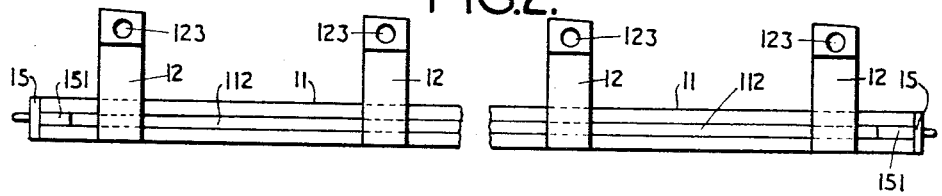
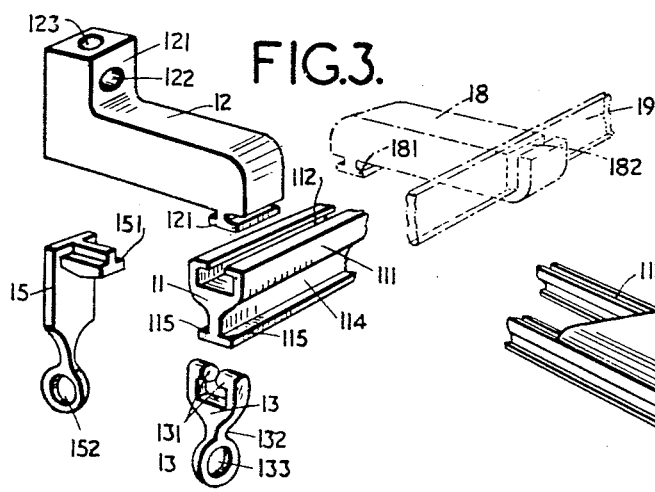
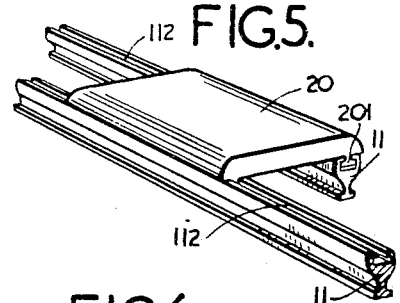
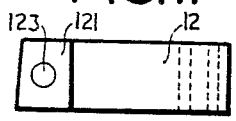
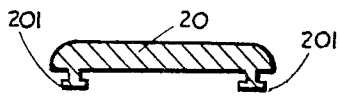

Dec. 20, 1955   R. W. HANKIN ET AL   2,727,272
CURTAIN SLIDE, TRACK AND BRACKET
Filed Feb. 12, 1952   2 Sheets-Sheet 2
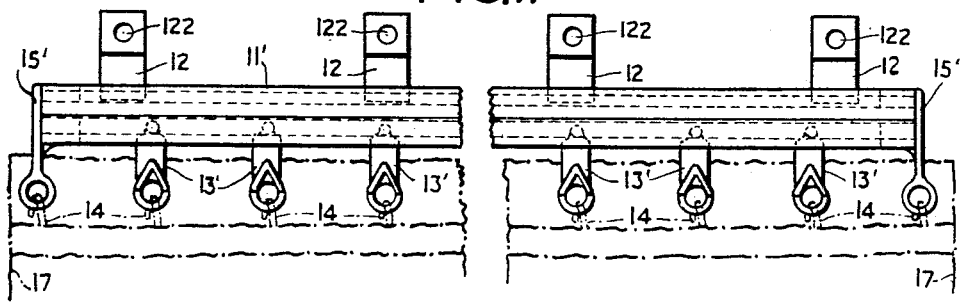
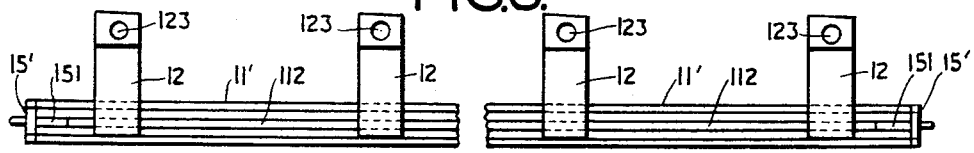
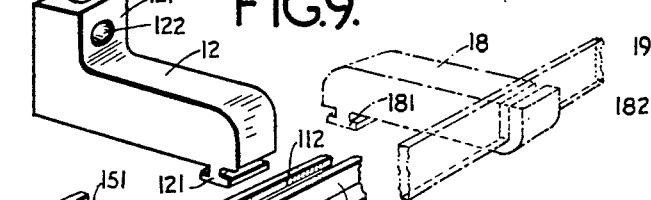
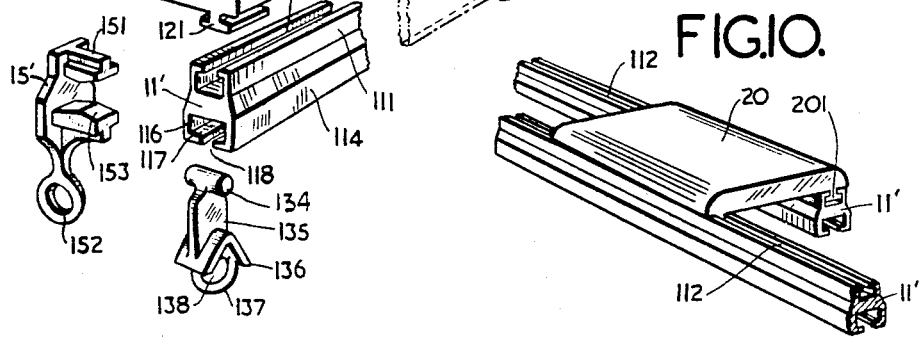

United States Patent Office 2,727,272
Patented Dec. 20, 1955

2,727,272

CURTAIN SLIDE, TRACK AND BRACKET

Robert William Hankin, Shirley, Birmingham, and Herbert Glyndwr Osborne, Great Barr, Birmingham, England, assignors to Swish Products Limited, Birmingham, England, a corporation of Great Britain Application February 12, 1952, Serial No. 271,172

Claims priority, application Great Britain February 24, 1951

3 Claims. (Cl. 16—93)

This invention has reference to improvements relating to curtain suspension devices and is concerned particularly with curtain suspension devices of the type incorporating a rigid track which is adapted to be secured to a relatively fixed part such as a window frame or a wall or a ceiling and a plurality of gliders or runners which are adapted to depend from and to be traversed along the track and from which the curtains are suspended.

The present invention has for its object to provide an improved means for supporting the track of curtain suspension devices of the type aforesaid.

Accordingly the invention consists in a curtain suspension device of the type hereinbefore referred to in which the upper portion of the track is provided with a continuous longitudinal groove and in which the fixing brackets for the track are provided with shaped portions of a similar cross sectional shape and dimensions to the cross sectional shape and dimensions of the groove so that the said parts can be engaged within the groove aforesaid by an endwise sliding movement.

According to the invention also the longitudinal groove is adapted to receive the correspondingly shaped portions of valance rail supports and of linking brackets and of end stops so that valance rail supports and linking brackets may be engaged within the longitudinal groove by an endwise sliding movement and the relevant portions of the end stops plugged into the ends of the said groove.

The invention will now be described with particular reference to the accompanying drawings in which:

Figure 1 is a front elevation illustrating the invention in its application to curtain suspension devices of the type hereinbefore specified in which the curtains are adapted to be suspended from gliders which are adapted to be supported from and traversed along external tracks constituted by the upper surfaces of the bottom flange of a track section of a substantially inverted T shape in cross section.

Figure 2 is a plan of the curtain suspension device illustrated in Figure 1.

Figure 3 is a view in perspective showing separated the components of the curtain suspension device illustrated in Figures 1 and 2 and indicating in dotted lines the outline of means for supporting a valance rail if such an adjunct is required.

Figure 4 is a plan of one of the fixing brackets employed in the curtain suspension device illustrated in Figures 1 and 3.

Figure 5 is a fragmentary view showing the means of arranging the linking of overlapping sections of track.

Figure 6 is a cross section of the overlapping linking bracket illustrated in Figure 5.

Figure 7 is a front elevation illustrating the invention as applied to curtain suspension devices of the type hereinbefore specified in which the curtains are suspended from gliders adapted to be supported from and traversed along tracks provided in the interior of a hollow track chamber.

Figure 8 is a plan of Figure 5.

Figure 9 is a perspective view of the component parts of the curtain suspension device illustrated in Figures 5 and 6 shown separated and indicating in dotted lines the outline of means for supporting a valance rail if such an adjunct is required, and Figure 10 is a perspective view showing the linking of overlapping sections of the track utilised in the embodiment illustrated in Figures 7–9.

In the drawings, like numerals of reference indicate similar parts in the several views.

Referring first to the embodiment of the invention as illustrated in Figures 1–6.

According to the said illustrated embodiment of the invention the improved curtain suspension device comprises a track section designated generally by the reference numeral 11 having a thickened upper portion 111 in which is provided a continuous centrally disposed longitudinal groove 112 of a substantially T shape in cross section which is open along the top, and a lower portion 114 of substantially inverted T shape in cross section.

Within the groove 112 hereinafter termed the fixing groove 112 are adapted to be engaged by an endwise sliding movement the inverted T shaped tongues 121 which are formed on the underside of the forwardly projecting end portions of fixing brackets 12 which are adapted to be screwed or attached to a window frame or to a wall or to the ceiling by driving fixing screws (not shown) through one or other of the intersecting holes 122, 123 as may be required and in a manner well known.

The upper surfaces 115 of the flange of the lower portion 114 of the track section 11 serve to support the inwardly directed and oppositely disposed cylindrical sections 131 of pendent gliders designated generally by the reference numeral 13.

The pendent portions 132 of the gliders 13 are provided with holes 133 for the reception of the curtain suspension hooks 14 in the known manner.

The ends of the fixing groove 112 are adapted to be closed by end stops 15 which are provided with shaped portions 151 which are counterpart in cross section to the cross section of the fixing groove 112 and which are adapted to be engaged within the ends of the fixing groove 112 by plugging the said shaped portion 151 thereinto until the end stop 15 abuts the presented end of the track section 11.

The end stops 15 are provided at the lower end with holes 152 which serve for the engagement therewith of the end curtain hooks 14 for the purpose of anchoring the curtains 17 in the known manner.

In the case where a valance is required there is provided valence rail supporting brackets 18 which are provided on the underside of the inner end portion thereof with inverted T shape portions 161 similarly in cross sectional shape and dimensions to the cross sectional shape and dimensions of the fixing groove 112 so that the valance rail brackets 18 in addition to the fixing brackets 12 may be associated with the track section by engaging the respective complementary shaped portions within the said fixing groove 112 by an endwise sliding movement.

The forwardly projecting end portions of the valance rail brackets 18 are provided with a vertical slot 182 which is open at the top for the reception of the valance rail 19.

As the use of valance rail brackets 18 and the complementary valance rail 19 are not essential, these components are indicated in dotted lines only in the drawings.

In the case where it is desired to arrange for an overlap of the end portions of adjoining track sections 11 the overlapping sections are adapted to be connected by an overlap linking bracket 20 as illustrated in Fig. 5.

This overlap linking bracket 20 is constituted by a block which is provided with depending parallel tongues 201 similar in cross section to the cross section of the fixing groove 112 so that the overlapping sections of the track may be linked by sliding the relevant depending tongues 201 in the respective fixing grooves 112.

The ends of the fixing brackets 12 are inclined slightly as indicated in Figure 4 so that when a fixing screw is driven through the horizontal hole 122 a slight canting movement is imparted to the fixing bracket 12 which ensures a binding of the tongues 121 of the fixing brackets 12 within the fixing groove 112 which ensures the secure holding of the track section 11.

Preferably a length of the suspension device is made up complete with gliders 13, fixing brackets 12, valance rail supporting brackets 18, if required, and end stops 15, as ordered, thereby dispensing with assembly by the user and thus facilitating fitting. In this connection it will be understood that the end stops 15 when plugged into the fixing groove 112 by reason of the width of the abutting portions of the said end stops 15 being substantially the same as the width of the lower portion 114 of the track section retain on the assembled length the gliders 13 which have been threaded on to the track section and also the fixing brackets 12 and the valance rail supporting brackets 18 which may have been engaged within the fixing groove 112.

The track section 11 is formed from a synthetic plastic material by an extrusion process or by a moulding process.

Similarly the fixing brackets, 12, the gliders 13, the end stops 15, the valance rail brackets 18 and the linking brackets 20 are made of synthetic plastic material.

Further instead of gliders 13 the curtains may be suspended from pendent runners of known type provided with rollers which are adapted to be supported on and to be traversed along the tracks 115 in a known manner.

In the embodiment illustrated in Figures 7-10 the gliders 13' are adapted to be supported within and to be contained partially within a track chamber 116 constituting the lower portion 114 of a track section 11' the upper portion 111 of which is provided as in the embodiment first described with a fixing groove 112 of an inverted T shape in cross section.

Likewise the fixing groove 112 aforesaid is adapted to have engaged therein by an endwise sliding movement the shaped portions 121 of fixing brackets 12 and if required the shaped portions 181 of valence rail supporting brackets 18.

The ends of the track section are adapted to be closed by end stops 15 having shaped portions 151 and 153 which are counterpart in cross section to the cross sections of the fixing groove 112 and of the track chamber 116 respectively so that the said shaped portions may be plugged into the end of the said fixing groove 112 and track chamber 116 as appropriate.

The gliders 13 are each provided at the upper portion with a transverse cylindrical portion 134 of the length which is slightly less than the maximum width of the track chamber 116.

The under surfaces of the cylindrical portions 134 are adapted to rest on and to be caused to glide along the upper surfaces of the inwardly turned sections 117 bounding the longitudinal slot 118 in the bottom of the track chamber 16.

Each of the cylindrical portions 134 aforesaid is carried at the upper end of an intermediate portion 135 of rectangular shape in cross section which merges at the lower end into a transverse portion 136 of an inverted V shape in cross section.

The gap between the lower ends of the transverse inverted V shaped portion 136 is bridged by an arcuate portion 137 which is located in the same plane as the intermediate portion 135, the hole 138 bounded by the inner surfaces of the transverse inverted V shaped portion 136 and the arcuate bridge portion 137 serving for engagement of the hooks 14 by means of which the curtains 17 are suspended from the gliders 13'.

The intermediate portion 135 is made of a width which prevents twisting of the gliders in the slot 118 in the bottom of the track chamber 116 whilst the transverse inverted V shaped portions 136 which are of substantially the same width as the bottom of the lower portion of the track section 11' prevent jamming of the gliders 13' when the said gliders 13' are moved into contact with one another when a curtain 17 is in the process of being drawn back.

Overlapping sections of the track are connected by overlap linking brackets 20 having shaped portions 201 adapted to be slidden into the respective fixing grooves 112 as in the embodiment first described.

The track section 11' is made of a synthetic resinous material.

Likewise the gliders 13' and overlap linking bracket 20 are made of a synthetic resinous material.

As in the embodiment first described the length of track may be ordered and cut off to length and sold as an assembly complete with the requisite number of gliders 13 threaded into the track chamber 116 and the requisite number of fixing brackets 12 and valance rail supporting brackets 18, if required, engaged in the fixing groove 112 and retained therein by end stops 15.

In the last mentioned modification also pendent runners having rollers adapted to be supported on and to be traversed along the tracks 117 may be substituted for the gliders 13.

In each of the embodiments described it will be appreciated that wedging forces are induced by the canting effect produced by the inclination of the abutting surfaces of the fixing brackets 12 supplemented by variations in the surface of the part to which the said brackets 12 are fixed and by even the slightest bending of the track section 11 thus ensuring that the track section 11 is held firmly by the fixing brackets 12. However if desired the fixing brackets 12 may be provided with set screws the noses of which can be caused to impinge on the portion of the track section 11 engaged within the fixing groove 112 for ensuring a firm gripping of the said track section 11.

We claim:

1. In a curtain suspension device, a glider comprising an upright body portion of rectangular cross section merging at its upper end into a transverse cylindrical portion by which the glider as a whole may be freely suspended, and merging at its lower end into an arcuate portion lying in the same plane as said body portion, said body portion also having a transversely projecting configuration in the shape of an inverted V which bridges the arcuate portion of the glider.

2. In combination a curtain rail of synthetic plastic material having an upper portion provided with an open-topped longitudinal groove the open top of which is narrower than the internal portion of the groove and a tracked lower portion from which traversable curtain suspension means are adapted to depend, and a bracket of synthetic plastic material for supporting the curtain rail having a solid block fixing section and an integral solid forwardly projecting section having at the outer end thereof a dependent section of similar cross section to the groove in the upper portion of the rail so that the said dependent section is engaged within the longitudinal groove by an endwise sliding movement, said solid block fixing section having a rear abutment surface which is inclined relatively to the longitudinal axis of the forwardly projecting section, whereby when the fixing section is secured to a wall a torsional stress is induced in the dependent section and the said section is thus wedged securely within the groove aforesaid at the chosen position without occasioning distortion of the rail.

3. In combination a curtain rail of synthetic plastic material having a thick upper portion provided therein with an open-topped longitudinal groove of inverted T cross section, a tracked lower portion from which traversable curtain suspension means are adapted to depend, and a bracket of synthetic plastic material for supporting the curtain rail having at one end a solid cubical fixing block provided therein with holes for the passage of screws whereby the fixing block may be secured to a wall and an integral solid forwardly projecting section having at the outer end thereof a transverse dependent section of inverted T cross section which engages within the longitudinal groove by an endwise sliding movement, said solid cubical block fixing section having a rear abutment surface which is inclined relatively to the longitudinal axis of the forwardly projecting section whereby when the cubical block fixing section is secured to a wall a torsional stress is induced in the dependent section and the said dependent section is wedged securely within the groove aforesaid at the chosen position without occasioning distortion of the rail.

References Cited in the file of this patent

UNITED STATES PATENTS

| | | |
|---|---|---|
| 2,231,305 | Vallen | Feb. 11, 1941 |
| 2,320,308 | Silverman | May 25, 1943 |
| 2,597,224 | Charron et al. | May 20, 1952 |

FOREIGN PATENTS

| | | |
|---|---|---|
| 238,825 | Switzerland | Dec. 3, 1945 |
| 300,939 | Great Britain | Nov. 20, 1928 |
| 369,073 | Great Britain | Mar. 17, 1932 |
| 387,827 | Great Britain | Feb. 16, 1933 |
| 389,877 | Great Britain | Mar. 30, 1933 |
| 510,435 | Great Britain | July 28, 1939 |
| 545,742 | Great Britain | June 10, 1942 |
| 576,320 | Germany | May 11, 1933 |
| 607,396 | Germany | Dec. 22, 1934 |
| 738,153 | France | Oct. 11, 1932 |
| 744,611 | France | June 26, 1933 |